July 31, 1945.  C. GROSS  2,380,691
BLACKOUT MARKER LIGHT
Filed Nov. 25, 1941  2 Sheets-Sheet 1
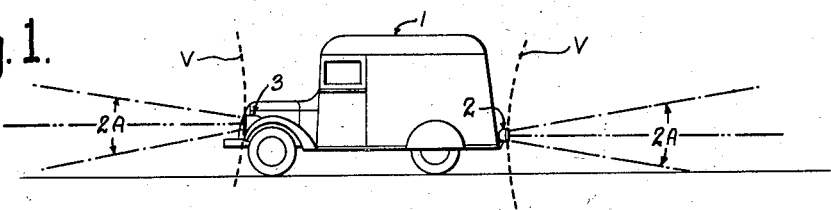
Fig. 1.
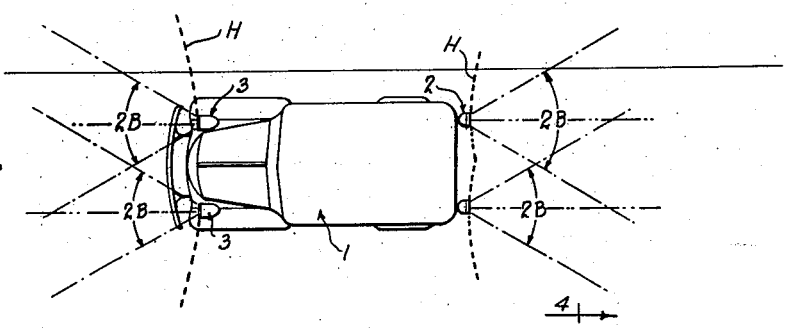
Fig. 2.
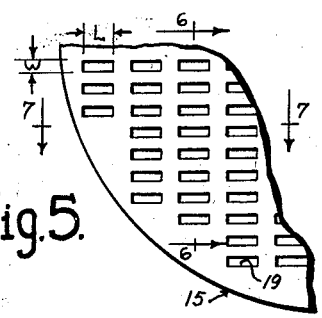
Fig. 5.
Fig. 3.
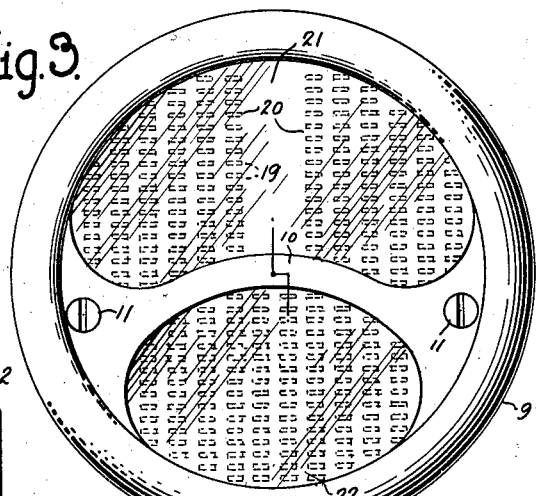
Fig. 4.
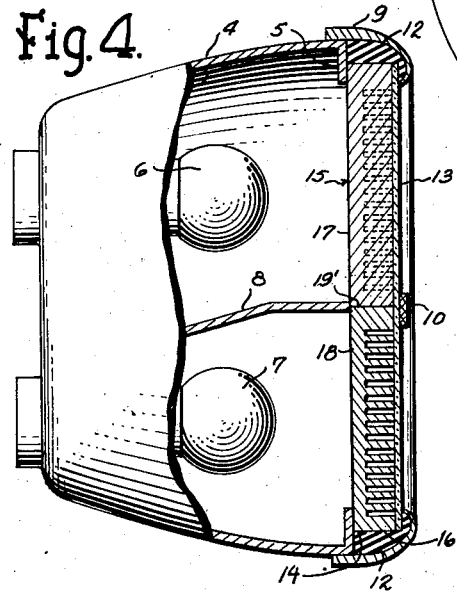
Fig. 7.
Fig. 6.
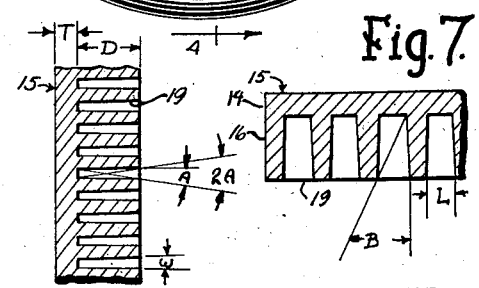
INVENTOR.
Charles Gross
BY
*L. L. Harmick, Jr.*
Attorney July 31, 1945.  C. GROSS  2,380,691
BLACKOUT MARKER LIGHT
Filed Nov. 25, 1941   2 Sheets-Sheet 2

INVENTOR.
Charles Gross
BY
Attorney

Patented July 31, 1945

2,380,691

UNITED STATES PATENT OFFICE 2,380,691

BLACK-OUT MARKER LIGHT

Charles Gross, Detroit, Mich., assignor to Evans Products Company, Detroit, Mich., a corporation of Delaware Application November 25, 1941, Serial No. 420,383

6 Claims. (Cl. 177—329)

This invention relates to marker or signal lights—as distinguished from illuminating lamps—and is intended particularly for blackout use or for military purposes where it is important that the region within which the light is visible is definitely limited as to length and especially as to height and spread to avoid, for example, enemy nocturnal aerial observation or photography from above a predetermined low altitude.

Various arrangements have been used or proposed for such purposes, including focusing systems of lenses and/or parabolic reflector mirrors or systems employing axially spaced separate members with aligned openings or spaced apart metal grilles to limit the angle of visibility, together with separate color filters to color and reduce the intensity of the light. However, such systems are relatively complicated or expensive and do not give the several advantages of the present invention since they are apt to involve adjustments in use or assembly, to collect dirt, to be difficult to apply to existing lamps as on military vehicles, or to have improper optical properties, such as being visible from too great a height for a given or desired horizontal axial visibility length.

Accordingly, the general objects of this invention are to provide a compact cheap blackout light or unit to be used with a lamp which provides a simple solution to the above objections or practical requirements and which is uniformly effective and is well adapted to rapid mass production.

More particularly, the present objects are:

To provide a simple, sturdy, one-piece unit serving as a cover plate, an opaque light shield, a color filter and to reduce the light intensity, and also to give the desired cut-off angles and to limit visibility to the desired regions;

To provide such a unit, particularly for use on vehicles, which will limit the visibility thereof to an elongated teardrop shaped region or to give visibility thereof from close behind or in front of the vehicle through a wide angle but only for a limited lateral distance to prevent collisions at turns or hills, and yet prevent enemy observation from the side or from above at predetermined low altitude even when the vehicle and the light axis are tilted up, as on a hill;

To permit a simple design of few parts and having a small depth from front to back to give very small cut-off angles and to limit visibility to a long narrow region;

To provide such a unit which is relatively unbreakable and can be easily molded accurately or sharply from plastic; and To provide an easily assembled unit which can be readily applied to conventional or existing lamps.

Other objects and advantages will be apparent from the detailed description and drawings. As will be seen, this invention requires only a translucent plate which usually may be rather thin for conventional low candlepower bulbs, this plate having a plurality of deep, narrow recesses opening in, preferably from its outer face, to direct the light rays narrowly and to give the desired visibility region close to the lamp. These recesses may be of various proportions and arrangements to give the desired cut-off angles and to form signals or indicia, and may extend only part way through the plate, leaving an integral filter and cover plate, or else they may extend all the way through the plate for easier manufacture and the cover plate or color filter be suitably connected, as by cement or adhesive.

In connection with this invention it is important to note that the lamps or signal lights are not intended to illuminate an area to make other objects visible, like automobile headlamps, and that the problem is not to prevent glare or to direct properly a large proportion of the emitted rays of light, but to give a marker or signal which is invisible to the human eye or to normal cameras outside of a particular and rather sharply defined region, and is clearly visible to observers in this region so that they can follow it without eyestrain and thus prevent collisions.

In the accompanying drawings illustrating three specific examples of the invention:

Fig. 1 is a side elevation of a conventional truck carrying four lights according to my invention;

Fig. 2 is a top plan view of the same;

Fig. 3 is a rear end view of an otherwise conventional stop and tail light having a blackout filter and angular cut-off unit according to my invention;

Fig. 4 is a vertical section taken on the line 4—4 of Fig. 3;

Fig. 5 is an enlarged, fragmentary, rear end view of the blackout unit;

Fig. 6 is a vertical sectional view taken on the line 6—6 of Fig. 5;

Fig. 7 is a horizontal sectional view taken on the line 7—7 of Fig. 5;

Figure 8:
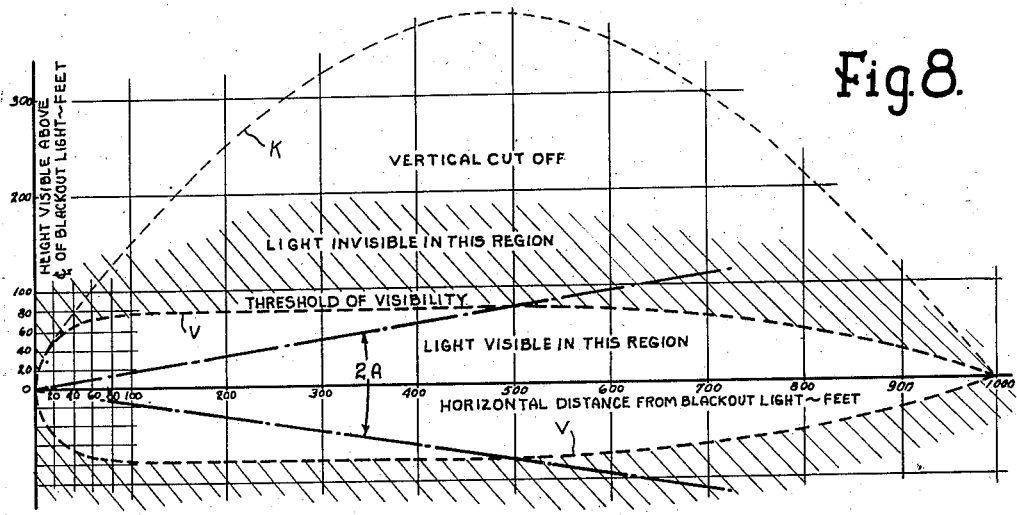
Fig. 8 is a curve primarily showing the area of visibility in a vertical axial plane through the blackout light.

Figures 1 and 2 show this invention used on a vehicle, such as the truck 1. In the rear are marker lamps 2, and in the front are marker lamps 3, the conventional headlights and rear taillights and stoplights not being shown for the sake of simplicity. As will be understood, the several lights may be controlled by suitable switches to permit use of conventional lights only, conventional stoplights only, blackout lights only, or all off. Also it will be apparent that marker lights employing this invention may be used in various forms and arrangements and not only on various types of vehicles, such as tanks, trailers, guns, but on boats or airplanes.

Figs. 3 and 4 show how this invention (the blackout unit as a whole carrying the number 15) may be employed in a conventional automobile or truck type combined tail and stop lamp having the body casing 4, with the flange 5, the taillight bulb 6, the bulb 7 to flash on to indicate a stop or turn, the partition 8 between the two bulb compartments, and the bezel on retainer 9. The insides of the two compartments in Fig. 4 are painted white, but are not otherwise specially formed reflectors. The one-piece, sheet metal retainer 9 has a cross portion 10 covering the curved partition 8, and may be secured by screws 11 received in suitable openings in the partition 8. The sealing gasket member 12 of rubber, or the like, is shaped as shown to fit the blackout unit 15, to seal the face or front of the lamp, and to clamp the unit 15 resiliently against the flange 5.

In the unit tested, as hereafter described, the bulb 6 was a conventional 6 volt, 3 candlepower, automobile taillight bulb.

The unitary member or plate 15 has several operative portions performing several functions. The portion 14 serves as a filter to reduce the intensity of the light transmitted and also to color it, if desired. Preferably, portion 14 is on the inner side of the member 15, or toward the light source, to thus reduce the intensity of the light and to prevent objectionable side glow. If the portion 14 were on the outside or outer face, the glow from its outer surface would be visible for an objectionable lateral distance. Portion 16 has suitably shaped openings extending or opening in from its outer face. These slots, recesses, or grooves 19 may be of various different face outlines or different shapes within the purview of this invention. As examples only, two different shapes or outlines are shown at 19a in Figs. 10 and 11 and at 19b in Figs. 12 and 13, although it will be apparent to those skilled in optics that other outlines or other shapes for the side walls of the openings may be employed.

Preferably, but not necessarily, the plate 15 or the portions 14 and 16 and their equivalents in the other embodiments are made of a suitable plastic. The preformed plastic plates can be punched or cut to form the recesses, or molded entirely in a die having pins to form the recesses 19, all as will be well understood by those skilled in the plastic art. This use of plastic permits a cheap and rapid mass production of the plate units having sharply and accurately formed recesses. The plastic used for the plate tested, as described below, was the Dow Chemical Company's "Ethocell" in their ruby red color.

In the first embodiment, portions 14 and 16 are integral so that the openings 19 do not extend all the way through from the outer face. These openings 19 are formed by pins which have a limited travel. For use on a tail and stop light, or where two colors may be desired, the plate 15 may be formed of two sections 17 and 18 cemented together by a suitable plastic bonding cement, as at 19', to form a unit. The curved joining line 19' is hidden in Fig. 3 by the curved bridge or connecting portion 10. As shown in Fig. 4, section 17 may be red, while the portion 18, which is occasionally illuminated by the higher powered bulb 7 to indicate a stop or turn, may be amber. If desired, the base portion 14 of the stoplight section 18 may be thinner, to give a more brilliant signal, in lieu of a more powerful bulb at 7.

If desired, a relatively thin cover or outer plate 13 may be employed to keep dirt out of the openings or ports 19. Plate 13 may be of clear glass or a hard material to resist abrasion from sand, or the like, and may be cemented to portion 16 to form a unitary part of 15. Of course, 13 may be of plastic or other materials and may be colored or tinted if desired, but a clear glass seems preferable to reduce laterally diffused light. The test unit did not have a cover plate, such as 13, and it is believed that better results will be obtained for some purposes without 13 since its absence will prevent a side glow or visibility due to laterally diffused light from the outer surface of plate 13.

The openings or recesses 19 may be arranged in suitably shaped groups to form indicia or give a signal. As shown in Fig. 3, the stoplight portion of the lamp has only a single group 22 of these openings 19 while the taillight portion has two groups 20 which are spaced apart one half an inch by a solid or opaque area 21 to give a stereoscopic effect. That is, with this particular lamp, inside a certain distance, such as sixty feet under normal conditions, the following driver will see that there are two separated light areas 20, while beyond this distance he will see only a single area of light, as the two areas will merge in his vision. This is useful as a distance indication to the trailing driver.

Referring to Figs. 6 and 7, it will be seen that the ratio of the depth of the openings 19 to their lateral dimension (assuming the side walls are substantially parallel to the axis) will determine the angular spread through which the color filter or bottom of the openings will be directly visible, which is the so-called cut-off angle. Thus, where the horizontal cut-off angle is B, the vertical cut-off angle is A, the horizontal lateral length of the slots is L, and the vertical lateral width of the slots is W, then tan $B$ is $$\frac{L}{D}$$

and tan $A$ is $$\frac{W}{D}$$

The model tested had the following dimensions:

$D = 0.250''$ or $\frac{1}{4}''$
$L = 0.140''$
$W = 0.040''$
$T = 0.058''$ (then remaining thickness of portion 14.)

Thus, as shown in Figs. 1, 2, 8 and 9, the total horizontal cut-off $2B = 60°$, while the total vertical cut-off $2A =$ about $20°$. As shown in considerably exaggerated fashion in Figs. 6 and 7, the openings have a certain slight draw, or the side walls are sloped slightly (about 3° to the axis) to permit easy withdrawal of the pins for molding.

The functions of the base portion 14 have been described above. The thickness D of portion 16 and the thickness T of portion 14, considered with their degrees of opaqueness, are just great enough so the regions between the openings 19 are opaque or transmit no light visible at any appreciable distance. As will be seen, the cut-off angles may be made as small as desired within the practical limits of making deep small holes, the horizontal and vertical cut-off angles may be different, and the holes may be of various forms, as noted above.

Figure 9:
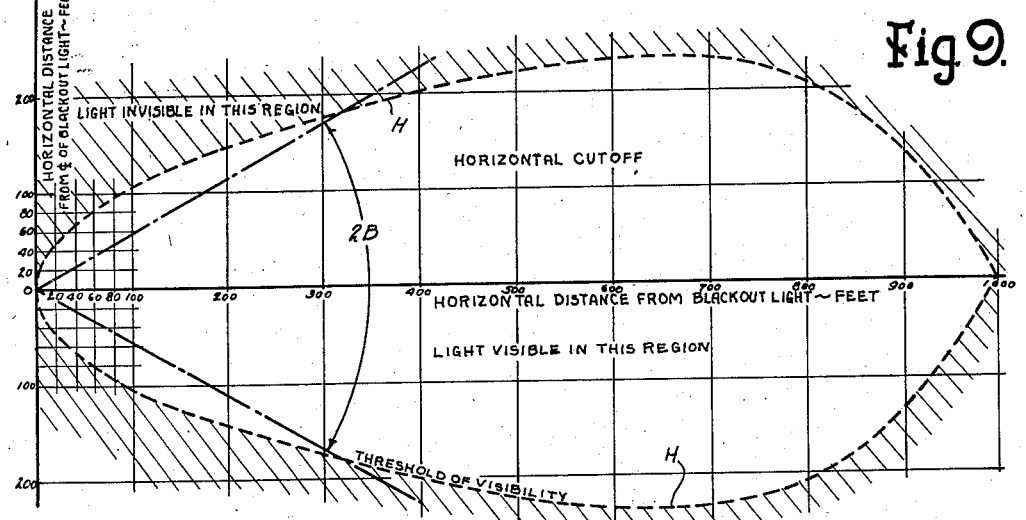
Fig. 9 is a similar curve primarily showing the area of visibility in a horizontal axial plane through the blackout light.

The curves, areas and angles shown in Figs. 8 and 9, and also partly in Figs. 1 and 2, are based on data carefully taken by several observers in open field tests on a normally dark night with the specific design, proportions and sizes described above in connection with Figs. 3 to 7, inclusive. Although the results will vary somewhat, due to different observers, different degrees of darkness or atmospheric conditions of visibility, and different amounts of light from the bulb or other light source, yet these curves are representative for this type of application and bring out the performance of one unit made according to this invention.

These curves are practically self-explanatory, although it may be noted that the curves V and H represent the threshold of visibility to normal eyes under normal conditions and that the curve K in Fig. 8 is put in by way of contrast since it shows the undesirable vertical visibility area obtained by another type of blackout light employing separately spaced metal grilles or grids and a separate color filter.

The so-called vertical cut-off angle 2A limits the region in which the bottoms of the slots or recesses are directly visible, yet, as will be seen from these figures, the visibility area is not limited or defined by the cut-off angle since the light is visible for a very wide angular zone well within the cut-off angle at a distance beyond about 500 feet. Thus, this vertical plane visibility area is shaped like an elongated teardrop or something like a cigar. As will be seen, the total axial visibility distance is about 1000 feet, which desirable long distance is a good result considering the narrow height of visibility. This 1000 foot length is controlled not only by the light from bulb 6, the thickness T and opaqueness of portion 14, but also by about all of the factors as to portion 16; i. e., the dimensions of openings 19, their number, etc.

This teardrop or cigar shape is very desirable, particularly for the vertical visibility area, since it gives axial visibility for well over the desired 800 feet in good weather and at least 60 feet under bad conditions, and is well within the present requirements that the light be invisible from heights above 400 feet when the vehicle is on a 20% downgrade, and that the glow cast down on the road shall not be visible above 400 feet. Yet it gives a wide angle visibility when close to the light, which is desirable to prevent collisions, to indicate turns, and the like, when trucks are running in close column, particularly over hilly terrain.

By comparing curves 8 and 9, the importance of the ratios $$\frac{W}{D}$$

and $$\frac{L}{D}$$

will be seen. It is found that the desirable characteristic of the elongated teardrop or cigar shape of Fig. 8 is lost when the ratio $$\frac{W}{D}$$

is less than about 1 to 4. This is particularly important for the vertical cut-off because of the danger of aerial observation.

Figure 10:
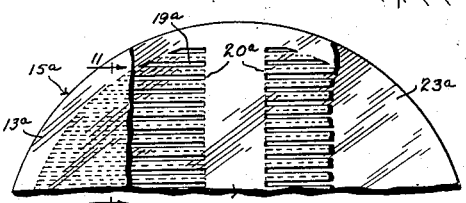
Fig. 10 is a fragmentary rear end view showing a modification of the blackout unit.

It may be desirable to eliminate the horizontal cut-off so that the light will be visible through a maximum horizontal lateral area, and this may be done by making L very large or using long slots 19a all the way across the group 20a, as shown in Fig. 10.

It is thought that the desirable results or the shape of the curve of Fig. 8 in particular, that is, the visibility wider than the cut-off angle when close to the light and narrower when at a distance, are due to the following factors. In addition to the different areas of the bottoms of slots 19 visible at different offset angles, there will be a certain amount of light transmitted through the translucent portion 16 and out through the side walls of slots 19. Also, some light will be reflected from the sides of slots 19. These two effects which depend on the relative dimensions and the relative translucence or opaqueness of portion 16 (and also portion 14) are believed to contribute to the wide angle close-up visibility but are not effective at a considerable distance. The tapered-off shape or the visibility area inside of the cut-off angle at a distance is believed to be due to the smaller total areas of the bottoms of the openings visible at points offset from the axis. As will be seen, all of the factors enter into a particular desired performance curve.

The rear lamp 2 on the right side need not include the stoplight feature, but is otherwise the same as the illustrated lamp 4. The front lights 3 are also similar, using a 3 CP bulb, having the stereoscopic effect but preferably having white or frosted white color for the units 15.

If desired, the openings may extend all the way through the separate portion 16, as shown in the two embodiments of Figs. 10 to 13. This may be advantageous in manufacturing, and also permits forming from the inner side a re-entrant shape opening, or one which has a larger inner portion, as shown at 19a in Fig. 11. It will be seen that openings such as 19a do not need any special slight taper or slope to the side walls since they may be formed by molding, punching, or the like, from the inner side, and the side walls of the openings 19a are, of course, already tapered. Also, when portions 14a and 16a or 14b and 16b are separate and cemented together, they may be of different materials and of different colors. If different colors are used, various effects may be obtained because of some of the light which first goes through portion 14a then being reflected from the side walls of the openings or transmitted through these side walls.

Figure 11:
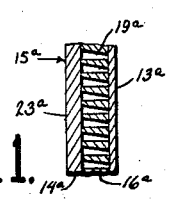
Fig. 11 is a vertical sectional view taken on the line 11—11 of Fig. 10.

The embodiment of Figs. 10 and 11 also shows that the visibility area may be thrown or directed to one side by a non-symmetrical type of opening 19a. This may be desirable as an indicia or signal, or in other special cases. In Figs. 10 and 11 the unit 15a is formed of the portion 14a as a separate plate 23a and is cemented to portion 16a which has the nonsymmetrical openings 19a, as described above, arranged in the two stereoscopic groups 20a. The outer clear and thin glass cover plate 13a may be used as required by the particular service.

Figure 12:
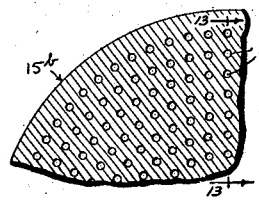
Fig. 12 is a vertical sectional view taken on the line 12—12 of Fig. 13 showing another modification of the same.
Figure 13:
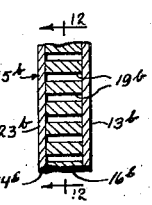
Fig. 13 is a vertical sectional view taken on the line 13—13 of Fig. 12.

In the third embodiment of Figs. 12 and 13, the inner portion 14B is a separate plate 23B and may be of a different color from portion 16b to which it is cemented. The outer clear cover 13b is also cemented on to form the unit 15b. The openings 19b are here shown round, cylindrical except for the slight taper for pin withdrawal, to give the same visibility areas in all axial planes; and the depth is very great relative to width or diameter so that the cut-off angles are quite small and the visibility areas will be of a greatly elongated or thin teardrop shape. This may be desirable for naval or aerial use.

While certain specific forms have been described in detail above as examples only, it will be understood that this invention may be practiced with various changes in proportions or form or other modifications within the spirit and scope of the following claims as limited by the prior art.

1. A marker blackout light shield to be normally used in upright position comprising a translucent plate having opening from its outer face a plurality of parallel, deep, slots of very narrow vertical widths to provide desired small vertical cut-off angles and of lengths greater than their widths to provide wider horizontal cut-off angles, said slots being open on the outer face of said plate, and an intensity reducing and diffusing filter on the inner face of said plate.

2. A marker blackout light shield to be normally used in upright position comprising a translucent plate having opening from its outer face a plurality of parallel, deep, slots of very narrow vertical widths to provide desired small vertical cut-off angles and of lengths greater than their widths to provide wider horizontal cut-off angles, said slots being grouped in patterns to form desired signal indicia.

3. As an article of manufacture for use in blackout devices of the character described, a one piece, translucent, molded plastic plate thick enough to be substantially opaque and having a plurality of substantially parallel, long, narrow, and much deeper slots opening in from its outer face and extending only part way through, the side walls of said slots being substantially parallel but with a slight taper to permit easy molding.

4. For use in a blackout marker and signal lamp including a light source and adapted to be normally horizontally directed; a unitary shield therefor comprising a translucent plate thick enough to be substantially opaque and having a plurality of deep openings of narrow vertical width opening from its outer face to restrict the visibility thereof to a limited vertical height, said openings being arranged in different groups to provide an observable signal.

5. For use in a blackout marker and signal lamp including a light source and adapted to be normally horizontally directed; a unitary shield therefor comprising a translucent plate thick enough to be substantially opaque and having a plurality of deep openings of narrow vertical width opening from its outer face to restrict the visibility thereof to a limited vertical height, said openings being arranged in different groups with different colored filters behind said different groups to provide a signal indication.

6. For use in a blackout marker and signal lamp including light source means and adapted to be normally horizontally directed; a unitary shield therefor comprising a translucent colored plastic plate thick enough to be substantially opaque and having a plurality of deep molded openings of narrow vertical width opening from its outer face to restrict the visibility thereof to a limited vertical height, a plastic color filter portion behind said openings, said plate and color filter portions being formed as a unitary member by sections of different colors cemented together edge to edge with openings in each to provide a signal indication by the different colors visible.

CHARLES GROSS.